(12) United States Patent
Vawter

(10) Patent No.: US 8,725,004 B1
(45) Date of Patent: May 13, 2014

(54) OPTICAL DOMAIN ANALOG TO DIGITAL CONVERSION METHODS AND APPARATUS

(75) Inventor: Gregory A. Vawter, Corrales, NM (US)

(73) Assignee: Sandia Corporation, Albuquerque, NM (US)

( * ) Notice: Subject to any disclaimer, the term of this patent is extended or adjusted under 35 U.S.C. 154(b) by 120 days.

(21) Appl. No.: 13/359,300

(22) Filed: Jan. 26, 2012

(51) Int. Cl.
*H04B 10/04* (2006.01)
*H03M 1/12* (2006.01)

(52) U.S. Cl.
USPC ........... 398/201; 398/175; 398/182; 398/200; 341/137; 341/155

(58) Field of Classification Search
None
See application file for complete search history.

(56) References Cited

U.S. PATENT DOCUMENTS

| | | | |
|---|---|---|---|
| 4,058,722 A | 11/1977 | Taylor | |
| H353 H | 10/1987 | Taylor | |
| 4,928,007 A | 5/1990 | Furstenau | |
| 5,381,147 A | 1/1995 | Birkmayer | |
| 6,118,396 A * | 9/2000 | Song | 341/137 |
| 6,175,320 B1 | 1/2001 | Heflinger | |
| 6,292,119 B1 | 9/2001 | Carillo, Jr. | |
| 6,326,910 B1 | 12/2001 | Hayduk | |
| 6,404,365 B1 * | 6/2002 | Heflinger | 341/137 |
| 6,571,028 B1 | 5/2003 | LoCascio | |
| 6,661,361 B1 * | 12/2003 | Lewis et al. | 341/137 |
| 7,564,387 B1 * | 7/2009 | Vawter et al. | 341/137 |

OTHER PUBLICATIONS

Soldano et al., "Optical Multi-Mode Interference Devices Based on Self-Imaging: Principles and Applications", Journal of Lightwave Technology, vol. 13, No. 4, 1995, pp. 615-627.
Spiekman et al., "All-Optical Mach-Zehnder Wavelength Converter with Monolithically Integrated DFB Probe Source", IEEE Photonics Technology Letters, vol. 9, No. 10, 1997, pp. 1349-1351.
Audouin et al., "Use of Fast In-Line Saturable Absorbers in Wavelength-Division-Multiplex Soliton Systems," IEEE Photonics Technology Letters, vol. 10, No. 6, 1998, pp. 828-829.
Kristian E. Stubkjaer, "Semiconductor Optical Amplifier-Based All-Optical Gates for High-Speed optical Processing", IEEE Journal on Selected Topics in Quantum Electronics, vol. 6, No. 6, 2000, pp. 1428-1435.
Burr et al., "28 ps recovery time in an InGaAsP/InGaAsp multiple-quantum-well saturable absorber employing carrier sweepout", Journal of Applied Physics, vol. 90. No. 7, 2001, pp. 3566-3669.

(Continued)

*Primary Examiner* — Ken Vanderpuye
*Assistant Examiner* — Merlin Brito Peguero
(74) *Attorney, Agent, or Firm* — Martin I. Finston

(57) ABSTRACT

Methods and apparatus for optical analog to digital conversion are disclosed. An optical signal is converted by mapping the optical analog signal onto a wavelength modulated optical beam, passing the mapped beam through interferometers to generate analog bit representation signals, and converting the analog bit representation signals into an optical digital signal. A photodiode receives an optical analog signal, a wavelength modulated laser coupled to the photodiode maps the optical analog signal to a wavelength modulated optical beam, interferometers produce an analog bit representation signal from the mapped wavelength modulated optical beam, and sample and threshold circuits corresponding to the interferometers produce a digital bit signal from the analog bit representation signal.

14 Claims, 6 Drawing Sheets

(56) References Cited

OTHER PUBLICATIONS

De Merlier et al., "All-optical 2R regeneration based on integrated asymmetric Mach-Zehnder interferometer incorporating MMI-SOA", Electronics Letters, vol. 38, No. 5, 2002, pp. 238-239.

Skogen et al., "Monolithically Integrated Active Components. A Quantum-Well Intermixing Approach", IEEE Journal of Selected Topics in Quantum Electronics, vol. 11, No. 2, 2005, pp. 343-355.

Raring et al., "40-Gb/s Widely Tunable Transceivers", IEEE Journal of Selected Topics in Quantum Electronics, vol. 13, No. 1, 2007, pp. 3-14.

George C. Valley, "Photonic analog-to-digital converters", Optics Express, vol. 15, No. 5, 2007, 28 pages.

Kim et el., "2R limiter circuit with gain clamped SOA for XGM wavelength converter", IEEE Proc. Optoelectron, 2005, vol. 152, No. 1, pp. 11-15.

\* cited by examiner

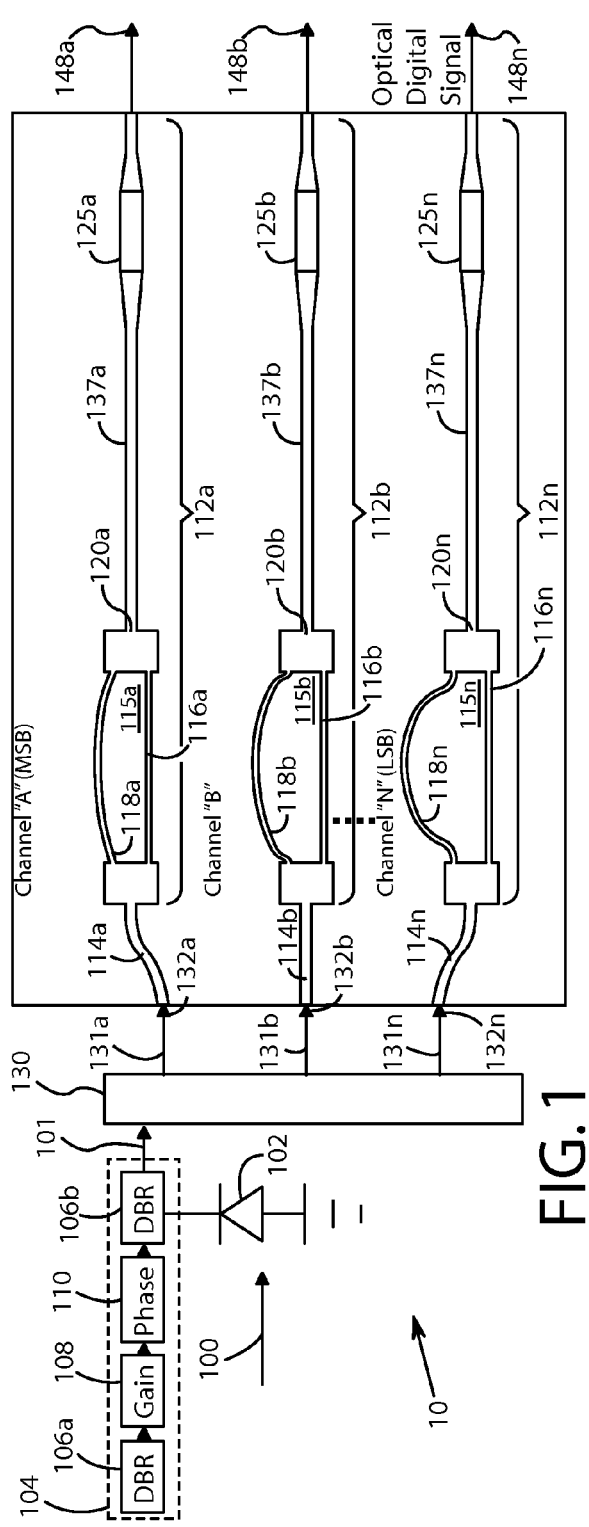
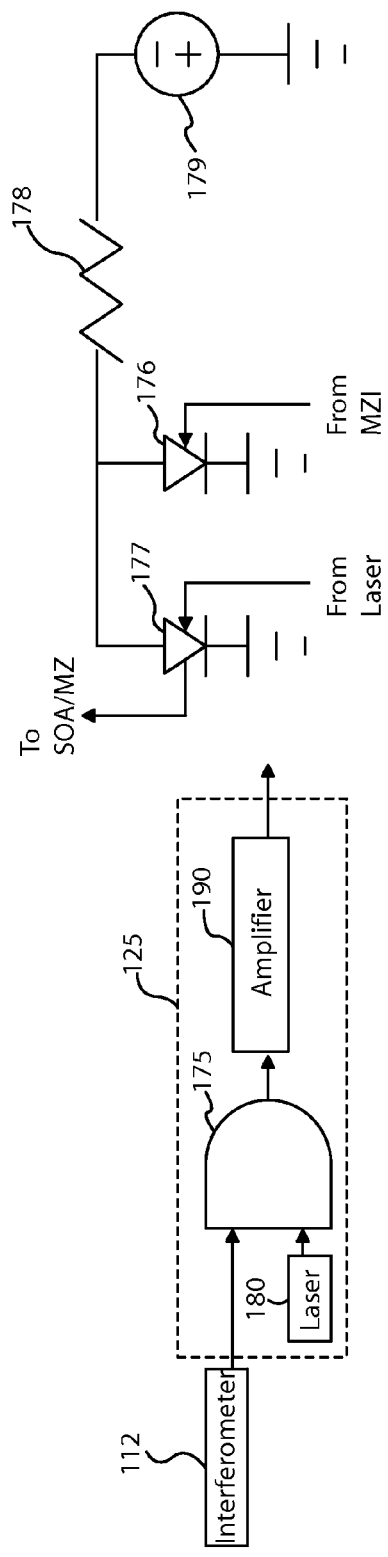
FIG. 1
FIG. 1A
FIG. 1B

US 8,725,004 B1

OPTICAL DOMAIN ANALOG TO DIGITAL CONVERSION METHODS AND APPARATUS

STATEMENT REGARDING FEDERALLY SPONSORED RESEARCH

This invention was developed under Contract DE-AC04-94AL85000 between Sandia Corporation and the U.S. Department of Energy. The U.S. Government has certain rights in this invention.

FIELD OF THE INVENTION

The present invention relates to analog to digital converters (ADCs) and, more particularly, to optical signal analog to digital conversion methods and apparatus.

BACKGROUND OF THE INVENTION

Conventional analog-to-digital converters (ADCs) are fabricated using electronic integrated circuits. The function of an ADC is to repeatedly sample a time-varying analog signal, generally at fixed time intervals, and to generate a digital representation of the analog signal with a certain level of precision. The precision of electronic ADCs is limited to an effective number of bits (ENOB) that decreases with increasing frequency.

Electronic ADCs are frequently used to convert optical analog signals to optical digital signals. In order to employ an electronic ADC in such a conversion, the optical analog signal is converted to an electrical analog signal, the electrical analog signal is then converted to a electrical digital signal, and the electrical digital signal is finally converted to optical digital signal. The optical to electrical and electrical to optical conversions degrade signal fidelity and power. Optical ADCs promise to overcome the limitations of electronic ADCs and to provide an improved speed and resolution for the digitization of optical analog signals.

SUMMARY OF THE INVENTION

Methods and apparatus for optical analog to digital conversion are disclosed. An optical signal is converted by mapping the optical analog signal onto a wavelength modulated optical beam, passing the mapped beam through interferometers to generate analog bit representation signals, and converting the analog bit representation signals into an optical digital signal. A conversion apparatus includes a photodiode to receive an optical analog signal, a wavelength modulated laser coupled to the photodiode that maps the optical analog signal received by the photodiode to a wavelength modulated optical beam, interferometers coupled to the wavelength modulated laser with each interferometer having an input coupled to the wavelength modulated laser and an output that produces an analog bit representation signal from the mapped wavelength modulated optical beam, and sample and threshold circuits corresponding to the interferometers, each sample and threshold circuit coupled to the output of the corresponding interferometer to produce a digital bit signal from the analog bit representation signal. Further, by performing analog to digital conversion of optical signal in the optical frequency domain, power losses associated with optical/electrical and electrical/optical conversion are avoided.

BRIEF DESCRIPTION OF THE DRAWINGS

The invention is best understood from the following detailed description when read in connection with the accompanying drawings, with like elements having the same reference numerals. When a plurality of similar elements are present, a single reference numeral may be assigned to the plurality of similar elements with a small letter designation referring to specific elements. When referring to the elements collectively or to a non-specific one or more of the elements, the small letter designation may be dropped. The letter "n" may represent a non-specific number of elements. Also, lines without arrows connecting components may represent a bi-directional exchange between these components. This emphasizes that according to common practice, the various features of the drawings are not drawn to scale. On the contrary, the dimensions of the various features are arbitrarily expanded or reduced for clarity. Included in the drawings are the following figures:

FIG. 1 is a block diagram partly in circuit diagram form of an optical domain analog to digital converter (ADC) in accordance with an aspect of the present invention;

FIG. 1A is a block diagram partly in circuit diagram form of a sample and threshold circuit for use in the ADC of FIG. 1;

FIG. 1B is a circuit diagram of an optical AND gate for use in the sample and threshold circuit of FIG. 1A;

DETAILED DESCRIPTION OF THE INVENTION

Figure 2A:
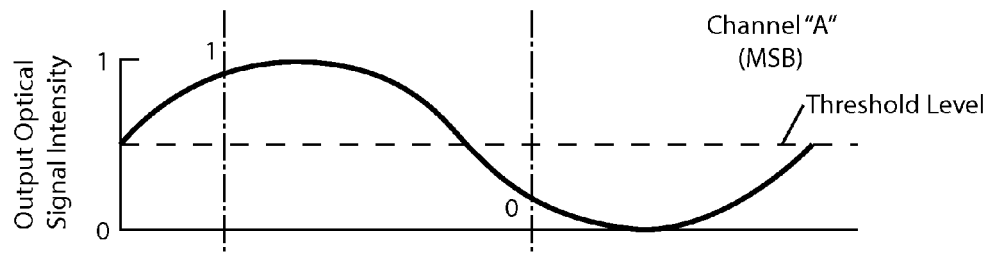
FIGS. 2A-2C are graphs showing the sinusoidally varying intensity of the optical output signal in the output waveguides of three channels of the optical domain ADC of FIG. 1 prior to digitizing the optical output signal using the sample and threshold circuits.

FIG. 1 depicts an embodiment of an optical analog-to-digital converter ADC 10 in accordance with aspects of the present invention. The optical ADC 10, which can be formed as a photonic integrated circuit (PIC) on a common III-V compound semiconductor substrate such as a gallium arsenide (GaAs) substrate or an indium phosphide (InP) substrate, is useful to generate an optical digital signal 150 from an optical analog signal 100 input to the optical ADC 10. The optical analog signal 100 can be provided, for example, by an optical fiber or a semiconductor laser (not shown) and can have a radio-frequency (rf) bandwidth from below 100 MHz to 10 GHz or more.

The optical analog signal 100 is mapped to a wavelength modulated optical beam to form a mapped optical beam 101. In the illustrated embodiment, a photodiode 102 coupled to a wavelength modulated laser 104 maps the optical analog signal 100 to the wavelength modulated optical beam. The illustrated laser 104 includes a pair of distributed Bragg reflectors (DBRs) 106a, 106b, a gain circuit 108, and a phase circuit 110. The photodiode 102 is coupled to the second DBR 106b of laser 104 to map the optical analog signal 100 onto the wavelength modulated optical beam being produced by the laser 104. In an embodiment, the intensity of the optical analog signal 100 is introduced as an electrical signal to the second DBR 106b by the photodiode 102 to produce constant intensity wavelength shifts in the optical beam being produced by the modulated laser 104. Suitable photodiodes and lasers for use with the present invention will be understood by one of skill in the art from the description herein.

The optical ADC 10 includes a plurality of channels 112a-n, which may be formed on the common semiconductor substrate, with the various channels 112 labeled "A," "B," and "N." In general, the optical ADC 10 includes N channels 112, where N is the number of bits being generated for the optical digital signal 101. Each channel 112 receives the mapped optical beam 101 at an optical input port 114 and uses the mapped optical beam 101 to generate a different bit of the optical digital signal 150. Each bit of the optical digital signal 150 can be provided to a separate output port 148. Each channel 112 of the optical ADC 10 includes an optical waveguide interferometer 115, which can be, for example, a Mach-Zehnder interferometer as shown in FIG. 1 or a Michelson interferometer, and also includes an optical sample and threshold circuit 125.

The optical waveguide interferometer 115 in each channel 112 has a pair of waveguide arms 116 and 118 that receive the mapped optical beam 101 after this beam 101 is split into a number N of portions corresponding to the number of channels 112 in the optical ADC 10. N can range, for example, from 2 to 12 or more, depending upon the precision required for conversion of the optical analog signal 100 to a digital format and the RF bandwidth of the optical analog signal 100.

For the optical ADC 10 in FIG. 1, the mapped optical beam 101 is split using an optical splitter 130. The optical splitter 130 includes a plurality of single-mode waveguides 131 and can be formed using branching waveguide Y-junctions. In other embodiments of the present invention, a 1×4 multimode interference splitter (MMI splitter)/lateral mode interference splitter (LMI) can be substituted for the optical splitter 130 in FIG. 1.

Each illustrated interferometer 115 includes a 1×2 MMI splitter at input port 114 to further split the mapped optical beam 101 into an additional two portions, with each portion of the mapped optical beam 101 being directed into each arm 116, 118 of the interferometer 115. The MMI splitter may include a single-mode input waveguide and two single-mode output waveguides that form the arms 116, 118 of the interferometer 115.

MMI splitters are well known in the art and need not be discussed in detail herein. See, for example, an article by L. B. Soldano et al., entitled "Optical Multi-Mode Interference Devices Based on Self-Imaging: Principles and Applications," in the Journal of Lightwave Technology, vol. 13, pp. 615-627, April 1995.

In FIG. 1, each interferometer 115 also includes a 2×1 MMI combiner to recombine the mapped optical beam 101 from each waveguide arm 116, 118 at an output end of that interferometer 115. The 2×1 MMI combiner can be formed as a mirror image of the 1×2 MMI splitter at the input port 114, with the two arms 116, 118 of the interferometer 115 providing inputs to a laterally-multimoded waveguide section, which, in turn, is connected to a single-mode waveguide at an output of the 2×1 MMI combiner. In other embodiments, branching waveguide Y-junctions can be substituted for the 1×2 MMI splitter and the 2×1 MMI combiner to form each Mach-interferometer 115.

Each portion of the mapped optical beam 101 can be optionally amplified by amplifiers 132 located between the optical splitter 130 and each optical waveguide interferometer 115. Amplifiers 132 may be semiconductor optical amplifiers (SOAs).

After being split, each portion of the mapped optical beam 101 is fed into each waveguide arm 116, 118 of each interferometer 115. A first arm 116 of each interferometer 115 is the same length (i.e., arms 116a, b, and n are the same length) and a second arm 118 of each interferometer 115 is a different length (i.e., arms 118a, b, and n are different lengths).

The difference in length between the arms 116, 118 of each interferometer 115 introduces a time delay, which is the same for all wavelengths. As the wavelength input into a non-symmetric interferometer 115 changes the relative phase difference between the two arms 116, 118 of the interferometer 115 also changes, causing the output intensity of the interferometer 115 to change. The lengths of the waveguide arms 118 in the different channels 112 of the optical ADC 10 in the example of FIG. 1 can be selected to be approximately equal to L, 2L, 4L, 8L, 16L, etc. to provide interaction lengths l that are in this same ratio (i.e., l, 2l, 4l, 8l, 16l, etc.) so that each interferometer 115 can be used to generate a different bit of the optical digital signal 150. In other embodiments, where more than five channels 112 are used in the optical ADC 10 to provide additional bits for the optical digital signal 150, the lengths of the interferometers 115 can be given by L, 2L, 4L, ... $2^{(N-1)}$L where N is the number of bits of the optical digital signal 150. In general, the lengths of the waveguide arms 116, 118 for the various interferometers 115 may range from about 100 micrometers up to a few centimeters (e.g., when using low loss optical materials such as silicon dioxide on a silicon wafer) depending upon the number of channels 112 in the optical ADC 10. The width of the waveguide arms 26 and the various other waveguides in the optical ADC 10 can be, for example, 3-4 micrometers, and may be selected to provide a fundamental mode propagation of the optical beam 101.

In the example of FIG. 1, a most significant bit (MSB) of the optical digital signal 150 is provided by channel "A" and a least significant bit (LSB) of the optical digital signal 150 is provided by channel "N." Each bit of the optical digital signal 150 in FIG. 1 is spatially separated so that it can be detected with a separate photodetector (not shown), or so that it can be directed into a separate optical fiber (not shown) to provide for parallel optical data transmission. When optical fibers are used for the parallel optical data transmission, they can be in the form of individual fibers or an optical fiber ribbon cable. In one embodiment, the parallel optical data can be combined into a serial optical data stream using techniques such as described below with reference to FIGS. 4A and 4B. In another embodiment, the parallel optical data can be placed onto a single optical fiber using wavelength division multiplexing (WDM). In accordance with this embodiment, each of the parallel optical data signals are converted to a different wavelength that matches one of the wavelength channels of the WDM system. For example, for 100 GHz wavelength separation between channels, wavelength conversion can be executed in a wavelength converting optical gate such as AND gate 175 (FIG. 1B).

Figure 2B:
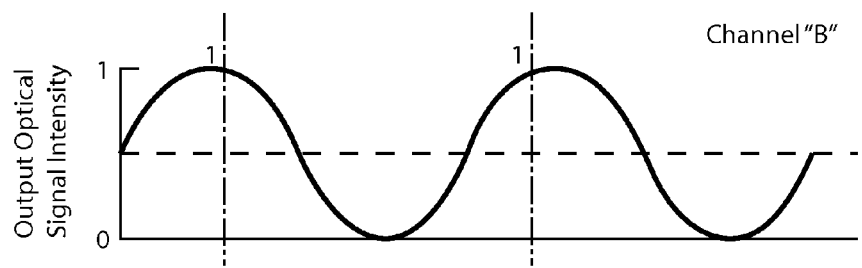
Figure 2C:
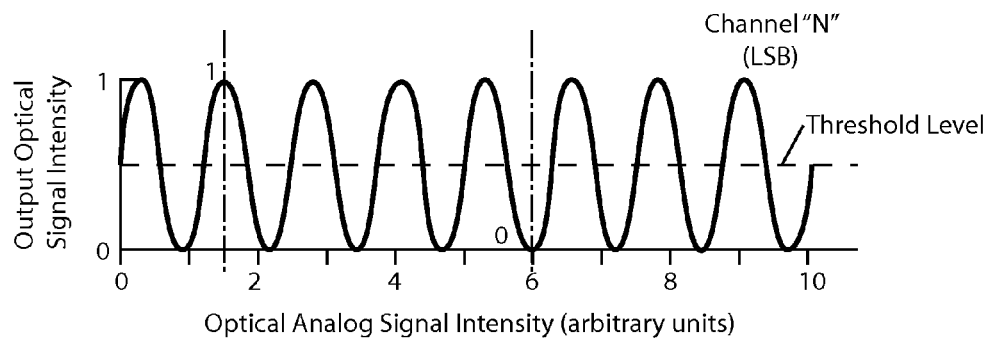

FIGS. 2A-2C schematically illustrate the sinusoidally varying intensity of the optical output signal (analog bit representation signal 137; FIG. 1) of the channels 112 of the optical ADC 10 of FIG. 1 prior to being digitized by the sample and threshold circuits 125. In FIGS. 2A-2C, the optical output signals for the channels are labeled "A," "B," and "N" and correspond to the same channels in FIG. 1. The horizontal dashed line in FIGS. 2A-2C indicates a threshold level of the optical sample and threshold circuit 125 (FIG. 1) above which the optical output signal is preferably converted to a logical "1" state by the optical sample and threshold circuit 125, and below which the optical output signal is preferably converted to a logical "0" state.

In FIGS. 2A-2C, the vertical dot-dash lines are provided to illustrate the optical digital signal 150 that will be generated by the optical ADC 10 for particular intensity levels of the input optical analog signal 100 corresponding to the locations of the vertical dot-dash lines. The digitized output which is generated by each channel of the optical ADC 10 is also indicated by the logical "1" and "0" states where the vertical dot-dash lines intersect with the sinusoidally varying curves for the optical output signals. Thus, for an optical analog signal intensity corresponding to the left-most vertical dot-dash line, the generated optical digital signal 150 after the sample and threshold circuit 125 will have a 3-bit binary representation "111" and the generated optical digital signal 150 for the optical analog signal intensity corresponding to the right-most vertical dot-dash line will be "010."

FIG. 1A depicts an embodiment of a sample and threshold circuit 125 for use in ADC 10 to convert the analog bit representation signal 137 from each interferometer 115 to a digital bit signal at output 148, i.e., being either high (a logical "1" state) or low (a logical "0" state). The sample and threshold circuit 125 including a sampling gate (e.g., an AND gate 175 in the illustrated embodiments) and a threshold element (e.g., an amplifier 190 in the illustrated embodiment such as a semiconductor optical amplifier (SOA)). Although the sample and threshold circuit 125 first samples the analog bit representation signal followed by thresholding, one skilled in the art will understand that these functions and components may be reversed. All of these elements may be formed from a III-V compound semiconductor such as InP, InGaAsP or GaAs.

The AND gate 175 receives the analog bit representation signal from the interferometer 112 at a first input port and pulses from a laser 180 at a second input port. The AND gate combines the analog bit representation signal with the laser pulses to produce a sampled signal. The sampling rate at which the optical digital signal 150 is generated in the optical ADC 10 is set by the pulse rate of the laser 180 and can be, for example, up to about 100 gigasamples per second (GSPS). The wavelength of laser 180 can be selected to be any one of supported WDM wavelength channels so that the AND gate 175 may be used to convert the wavelength of the resultant signal for multiplexing. Additionally, the width of the laser pulses produced by laser 180 affects the ENOB and bandwidth of the ADC 10. Short pulses are used for high-speed signals to obtain a high ENOB, i.e., in order to consider how much the input analog signal changes during the pulse. The pulse width that should be used for a maximum signal frequency, f, and a desired ENOB, N, is set forth in equation 1:

$$PulseWidth_{min} \leq \frac{1}{2^{N-1}\pi f} \quad (1)$$

So, with a frequency of 50 GHz and an ENOB of 8 bits, the pulse width would be 50 fs. For a frequency of 50 GHz and an ENOB of 6 bits, the pulse width could be 200 fs FIG. 1B depicts an embodiment of an AND gate 175 for use in the sample and threshold circuit 125. The illustrated AND gate 175 includes a photodiode 176 that senses light from the interferometer 112 and an electro-absorption modulator (EAM) 177 that modulates pulses from the laser 180 in response to an electric voltage. A bias voltage source 179 is coupled to the photodiode 176 and EAM 177 through resistor 178. The photodiode 176 introduced voltage fluctuations in response to the light from the interferometer 112. The EAM 177 behaves as a voltage controlled optical switch that modulates the laser pulses from the laser 180 to the amplifier 190 in response to the voltage fluctuations introduced by the photodiode 176. Additional details regarding AND gate 175 can be found in an article titled "Optical logic using interconnected photodiodes and electro-absorption modulators, PWA6" by E. Skogen, et al., in Photonics in Switching, Monterey, Calif. (2010), the contents of which are incorporated fully herein by reference.

Referring back to FIG. 1A, the amplifier 190 has an optical transmission characteristic that is nonlinear with the intensity of input light. In an SOA, forward biasing conditions are used. However, when the SOA is forward biased below a gain threshold level where optical amplification occurs, the SOA will absorb low-level light signals while being saturated to transmit high-level light signals. When the SOA is operated above the threshold level for optical amplification, the SOA will amplify both low-level light signals and high-level light signals with the high-level light signals possibly saturating the optical gain of the SOA. This latter mode of operation is generally not used for the optical sample and threshold circuit 125 although it is useful elsewhere in the optical ADC 10 when amplification of light signals is needed.

The saturation threshold level of the SOA can be set by the particular doping levels used for the p-n or p-i-n junction, and also by the bias conditions of the SOA. The saturation threshold level of the SOA can also be controlled by using the width, length or optical confinement factor of the SOA within the sample and threshold circuit 125 as variables. When the optical path through the SOA within 125 has a width greater than that of the optical waveguides, a tapered waveguide section can be provided on either side of the SOA within 125 to laterally expand or contract the mode of the light for coupling into and out of the sample and threshold circuit 125.

In the embodiment depicted in FIG. 1, the threshold level can be set between the minimum and maximum expected output optical signal intensity from each interferometer 115 as shown in FIGS. 2A-2C (e.g., roughly midway between). The threshold level for each optical sample and threshold circuit 125 can be set independently to compensate for differences in the output optical signal intensities for each channel 112 of the optical ADC 10 due to the different lengths of the arms 118 in the interferometers 115.

Each optical sample and threshold circuit 125 produces a digital train of pulses for a particular bit of the optical digital signal 150 at the frequency and wavelength of the laser pulses from laser 180 (FIG. 1A).

The optical ADC 10 of the present invention can be fabricated with a quantum-well intermixing process as described hereinafter using a plurality of III-V compound semiconductor layers epitaxially grown upon a substrate. The quantum-well intermixing process allows the many different PIC elements to be formed on a common semiconductor substrate 12 (FIGS. 3A-3D) much like integrated circuit fabrication while allowing the various elements including the waveguides, interferometers, SOAs, photodetectors and resistors to be individually optimized. This quantum-well intermixing process is described below with reference to FIGS. 3A-3D during various steps in the manufacture of the optical ADC 10.

Figure 3A:
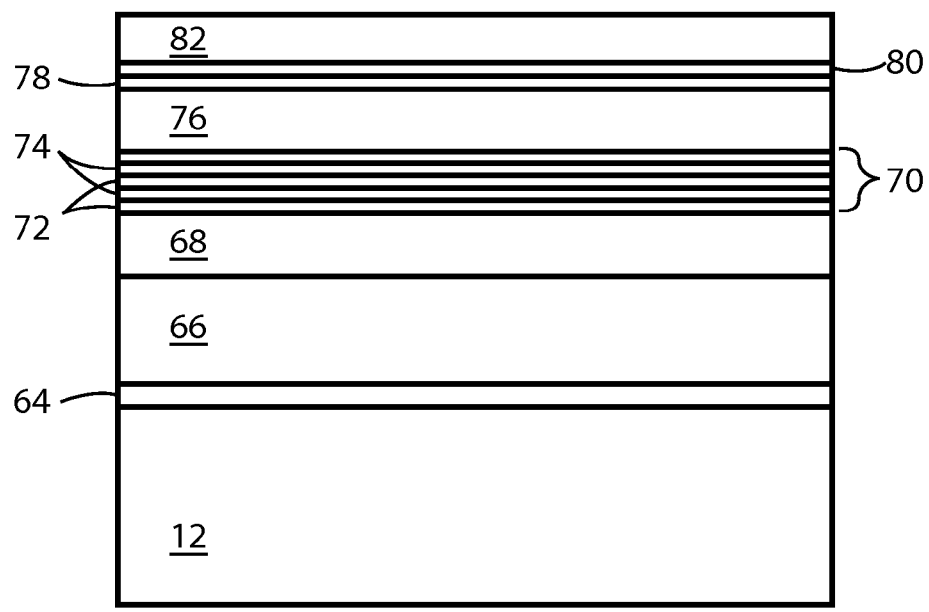
FIGS. 3A-3D are schematic diagrams of cross-section views of the ADC of FIG. 1 fabricated on a common semiconductor substrate using a quantum-well intermixing process.
Figure 3B:
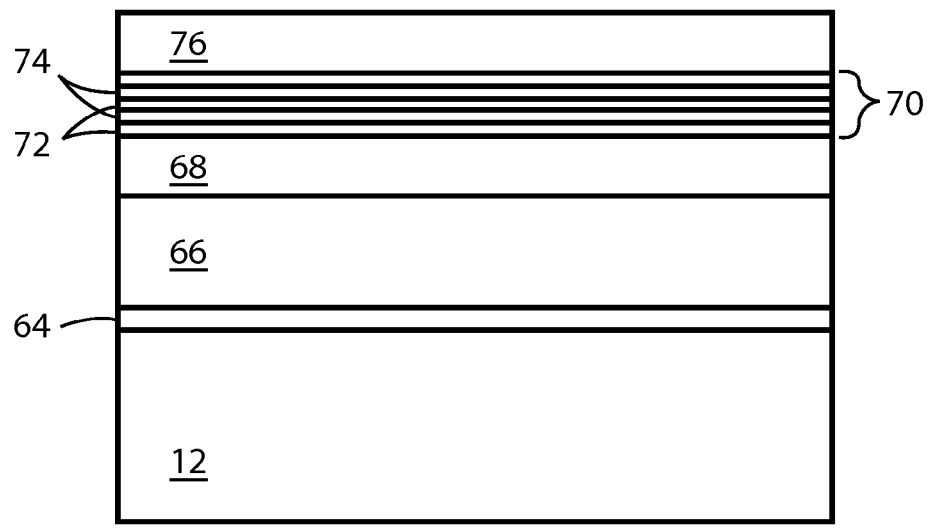

FIG. 3A shows a schematic cross-section view of the plurality of III-V compound semiconductor layers which can be initially epitaxially grown on the substrate 12 in preparation for fabricating the optical ADC 10. The III-V compound semiconductor layers can comprise, for example, indium phosphide (InP) and indium gallium arsenide phosphide (InGaAsP) and indium gallium arsenide (InGaAs) when the substrate 12 comprises InP. Alternately, the III-V compound semiconductor layers can comprise gallium arsenide (GaAs) and either aluminum gallium arsenide (AlGaAs) or InGaAsP when the substrate 12 comprises GaAs. The following discussion will describe fabrication of the optical ADC 10 using InP, InGaAsP and InGaAs, but those skilled in the art will understand that the various process steps described hereinafter can be applied with minor modifications to an optical ADC 10 formed from GaAs and AlGaAs, or any other III-V compound semiconductor materials.

In FIG. 3A, the substrate 12 can comprise a Fe-doped InP substrate 12 upon which are epitaxially grown by metal-organic chemical vapor deposition (MOCVD) in order the following layers: an InP buffer layer (not shown), an n-type InGaAs lower contact layer 64; a lower cladding layer 66 of n-type-doped InP which can be 1-2 µm thick; a lower waveguide layer 68 of InGaAsP which is n-type doped and about 0.11 µm thick with a composition selected to provide an energy bandgap $\lambda g=1.1$ µm; an undoped (i.e. not intentionally doped) MQW region 70 which is about 0.11 µm thick and comprises a plurality of alternating quantum well (QW) layers 72 and barrier layers 74 of InGaAsP each about 8 nanometers (nm) thick, with the quantum well layers 72 having an energy bandgap $\lambda g$ in the range of 1.3-1.7 µm, and with the barrier layers 74 having an energy bandgap $\lambda g=1.1$ µm; a upper waveguide layer 76 of p-type-doped InGaAsP about 0.11 µm thick with $\lambda g=1.1$ µm; an undoped InP etch stop layer 78 about 15 nm thick; an undoped InGaAsP etch stop layer 80 about 20 nm thick with $\lambda g=1.3$ µm; and an undoped InP implant buffer layer 82 about 0.45 µm thick.

An implant mask (e.g. comprising silicon nitride about 0.5 µm thick) can then be provided over the substrate 12 and III-V compound semiconductor layers with openings at locations wherein phosphorous ions are to be implanted into the InP implant buffer layer 82 for use in selectively disordering the MQW region 70. The locations where the photodetectors and the SOAs are to be formed will generally not have a disordered MQW region 70 since the MQW region 70 is epitaxially grown to optimize the performance of the photodetectors and SOAs. The phosphorous ions can be implanted into the layer 82 at an ion energy of about 100 keV and a dose of about $5 \times 10^{14}$ cm$^{-2}$ with the substrate 12 being at a temperature of about 200° C. The implanted phosphorous ions produce vacancies in the InP implant buffer layer 82.

A rapid thermal annealing step can then be used to drive the vacancies into the MQW region 70 to intermix the QW layers 72 and the buffer layers 74 at the interfaces therebetween. This intermixing produces a blue-shift in the energy bandgap in the MQW region 70. The rapid thermal annealing step can be performed at a temperature in the range of 630-700° C. and can be timed for a time interval from one minute up to a few tens of minutes to provide a predetermined energy bandgap for the MQW region 70 which will depend upon the exact elements of the optical ADC 10 being formed. To form the waveguide arms 116, 118 in each interferometer 115, a rapid thermal annealing step can be used to provide a few tens of nanometer blue-shift in the energy bandgap of the MQW region 70 to reduce an absorption loss therein. The blue-shift in the energy bandgap of the MQW region 70 can be determined using a laser-excited room-temperature photoluminescence spectroscopy measurement.

In the case where regions of lesser blue-shift are desired to form electro-optic modulators or bias tuning sections, after the first rapid thermal annealing step, the InP implant buffer layer 82 can be removed above these regions while leaving the layer 82 in place over the other regions of each interferometer 115. This can be done using a wet etching step to etch away the layer 82, with the wet etching being terminated upon reaching the InGaAsP etch stop layer 80. Removal of the InP implant buffer layer 82 above the arm 116 prevents any further blue-shift in the MQW region 70 at this location since it removes the source of vacancies necessary for quantum-well intermixing.

A second rapid thermal annealing step can then be performed at about the same temperature for up to a few minutes (e.g. 2-3 minutes) to provide further intermixing of the QW and barrier layers 72 and 74 to produce an additional few tens of nanometers blue-shift the energy bandgap of the MQW region 70 in the remaining regions where the InP implant buffer layer 82 is still present. This additional blue-shift in the energy bandgap of the MQW region 70 further reduces the absorption loss in the various waveguides forming the optical ADC 10.

After the second rapid thermal annealing step is performed, the InP implant buffer layer 82 and the InGaAsP etch stop layer 80 can be removed from the substrate 12 by wet etching. This is schematically illustrated in the cross-section view of FIG. 3B.

In an embodiment, to accommodate differences in lengths in the arms 116, 118 of an interferometer 125 an electrical bias is added to one of the arms 116, 118 of each interferometer 125 for tuning the array of interferometers 125 to set the "on" and "off" wavelengths. The electrical bias is used to apply an electric field that alters the refractive index in the biased section. In one embodiment, the tuning section is left partly blue-shifted (e.g., it is formed during the first rapid annealing step and shielded during the second rapid annealing step) to reduce the tuning voltage used for biasing. This may be accomplished by removing the InP implant buffer layer 82 (e.g., with a wet etching step that terminates upon reaching the InGaAsP etch stop layer 80). Removal of the InP implant buffer layer 82 prevents further blue-shift since it removes the source of vacancies needed for quantum-well intermixing. In another embodiment, the tuning section is fully blue-shifted (e.g., it is formed using both the first and the second rapid annealing step) to provide lower loss at the cost of higher tuning voltage.

Figure 3C:
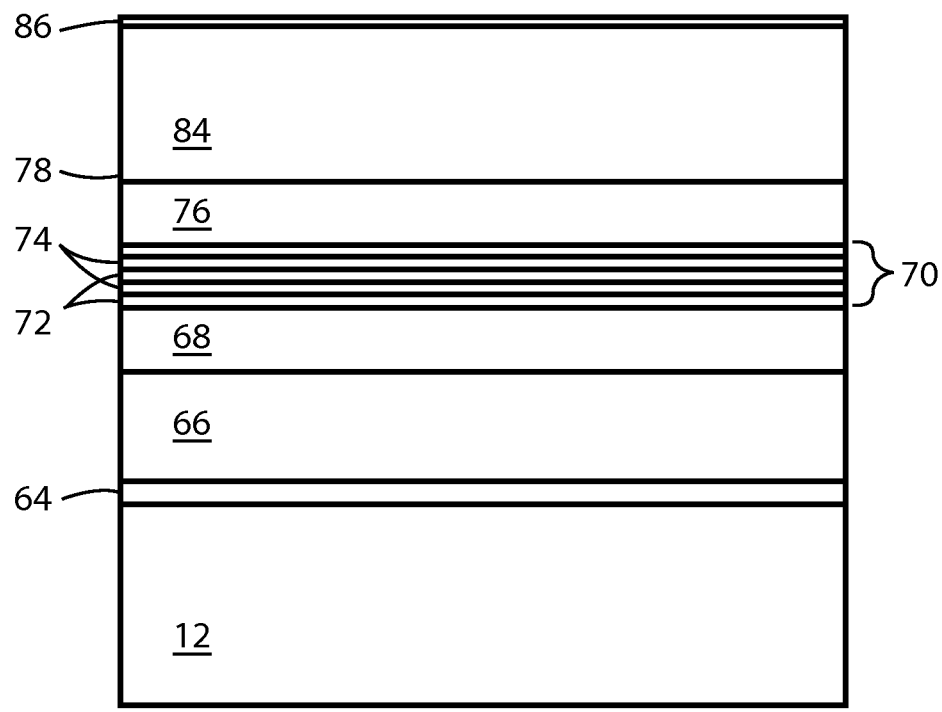

A blanket MOCVD regrowth can then be performed to epitaxially grow an upper cladding layer 84 of p-type-doped InP which can be, for example, 2.35 µm thick followed by a cap layer 86 of p-type-doped InGaAs about 0.2 µm thick. This is shown in FIG. 3C. The p-type-doped upper waveguide layer 76 and InP upper cladding layer 84 in combination with the n-type-doped lower cladding layer 66 and waveguide layer 68 form a semiconductor p-i-n junction about the MQW region 70 when the region 70 is left undoped (i.e. not intentionally doped). This semiconductor p-i-n junction is used for electrically-activated elements in the optical ADC including the arms 116, 118, the sample and threshold circuits 125, the SOAs and the waveguide photodetectors.

Figure 3D:
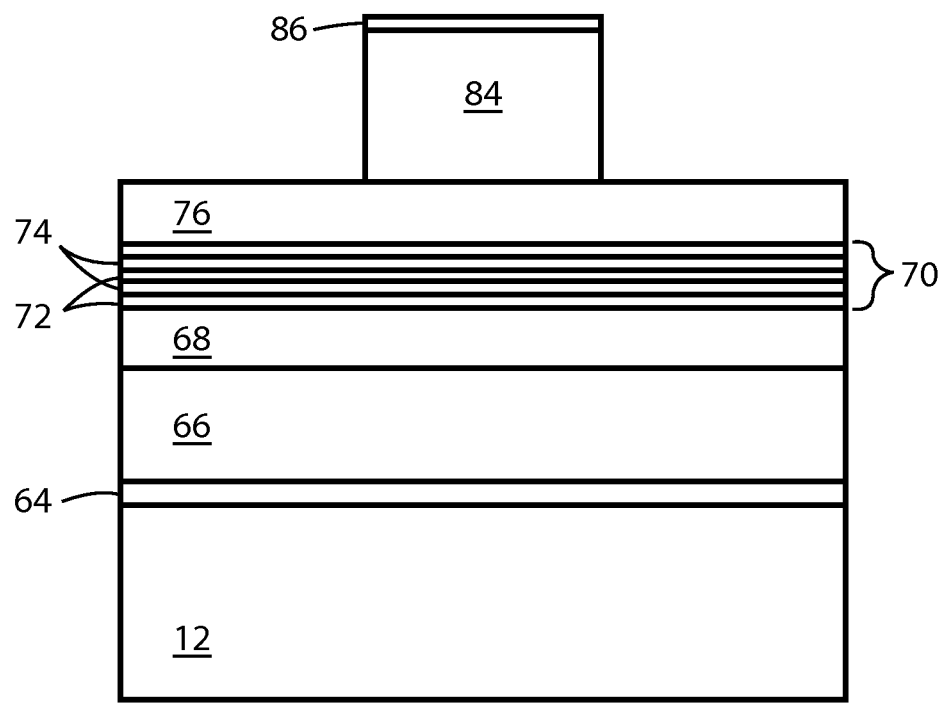

An etch mask (not shown) can be provided over the substrate 12 and photolithographically patterned for use in etching down through the InGaAs cap layer 86 and the InP upper cladding layer 84 as shown in FIG. 3D. This defines the lateral dimensions of the various waveguides in FIG. 1 which can be 3-4 µm wide. Etching down to the InGaAs lower contact layer 64 can also be performed in preparation for forming contact pads.

Layers of silicon nitride and benzocyclobutene (BCB) can then be deposited over the substrate 12 and patterned to provide openings where the various electrodes, resistors, wiring and contact pads are to be formed. The silicon nitride layer can be about 0.1-0.2 µm thick. The BCB layer can be about the same thickness (e.g. 2-3 µm) as the InP upper cladding layer 84 and can be used to planarize the substrate 12. This is useful to reduce the capacitance of the electrical wiring 60 for high-speed operation. Resistors can be deposited as thin-film metal resistors (e.g., comprising tantalum nitride or nichrome). A Ti/Pt/Au metallization can then be deposited and patterned by lift-off to form electrodes, wiring and contact pads and electrical connections to the optical sample and threshold circuits 125, SOAs and resistors.

Figure 4A:
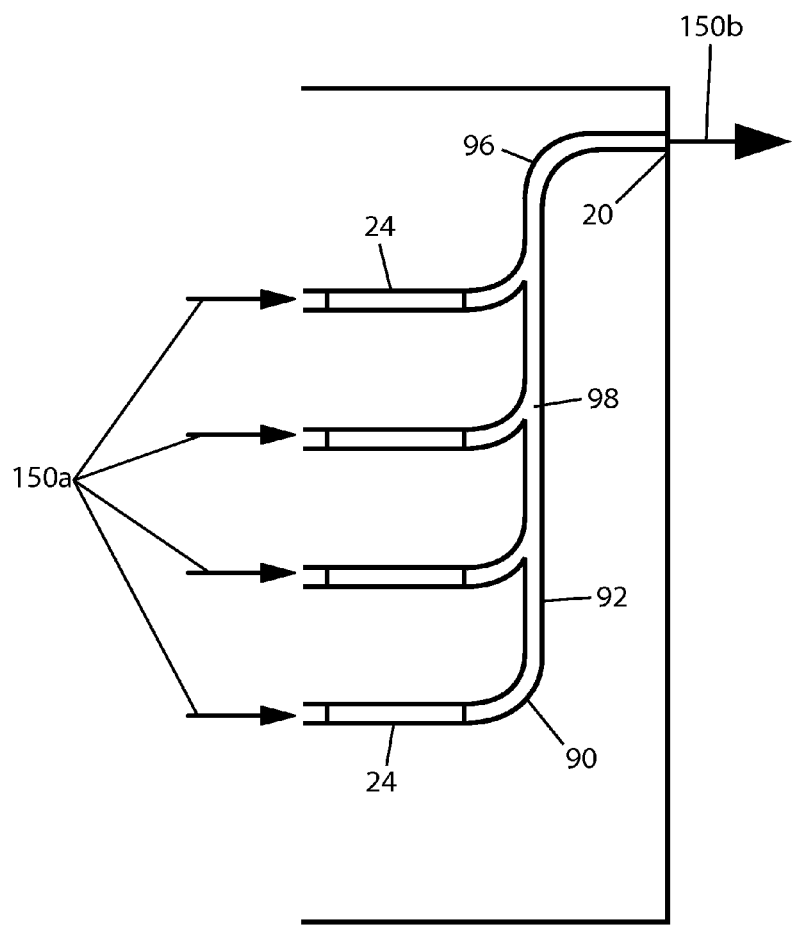
FIG. 4A is a schematic diagram of an optical waveguide combiner to provide a parallel-to-serial conversion of the digital output signal of the optical ADC of FIG. 1.
Figure 4B:
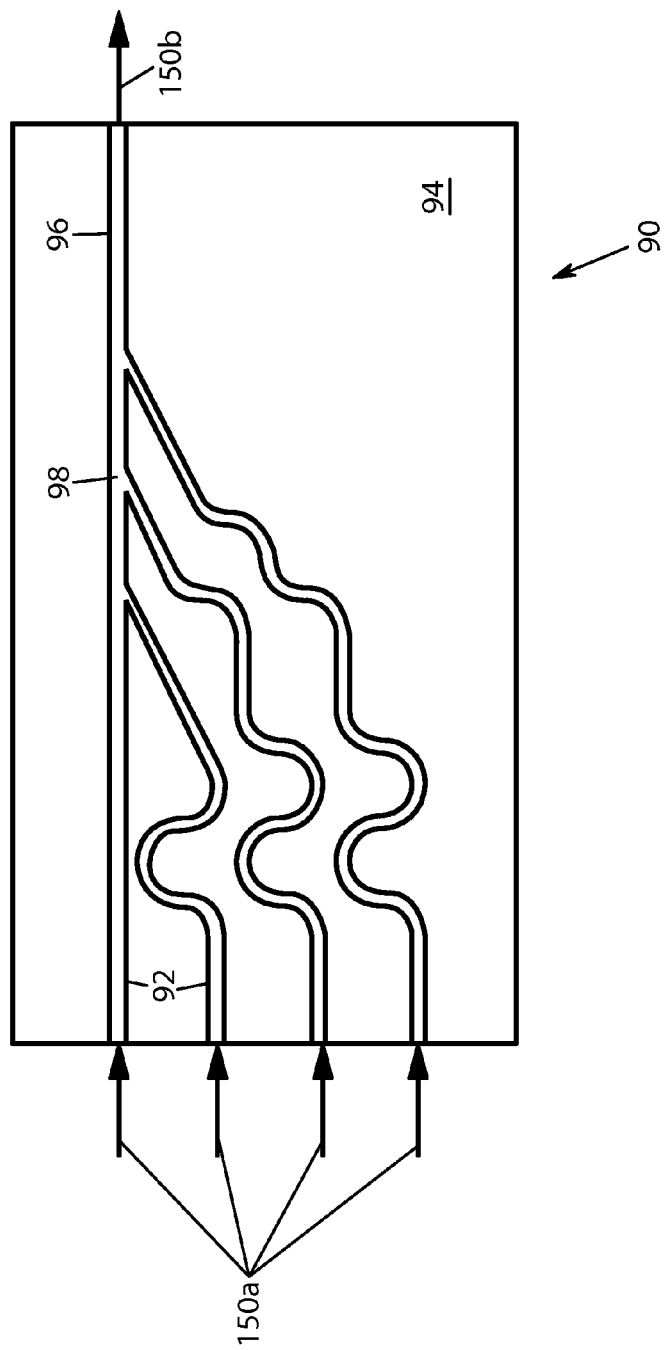
FIG. 4B is a schematic diagram of a photonic integrated circuit which can be formed on a separate substrate and used with the optical ADC of FIG. 1 to perform a parallel-to-serial conversion of the digital output signal of the optical ADC.

Although the optical ADC 10 described herein with reference to FIG. 1 provides a parallel output of each bit of the optical digital signal 150, in other embodiments of the optical ADC 10 an optical waveguide combiner 90 can be used to convert the parallel output 150a of the optical ADC 10 into a serial output 150b. Since each bit of the optical digital signal 150 comprises a series of logical "1" state and logical "0" state pulses at a clock frequency determined by the sampling optical signal 110, these pulses for each bit of the optical digital signal 14 can be interleaved and combined to form a train of N-bit digital words for the serial output. To properly time the pulses for each bit of the optical digital signal 150 so that they can be interleaved and combined, delay lines can be used. These delay lines are formed from different-length optical waveguides 92 located on the common semiconductor substrate 12 after the sample and threshold circuits 125 as shown in FIG. 4A, or alternately can be located on a separate substrate 94 as shown in FIG. 4B for butt-coupling to the optical ADC 10. The difference in length of the optical waveguides 92 for adjacent bits of the optical digital signal 14 depends upon the sampling rate and can be, for example, 1-20 millimeters (mm). For example when the sampling rate is 10 Gigabits per second (Gb/s) with each pulse being separated by 100 picoseconds (ps), the difference in length of the each adjacent pair of the optical waveguides 92 can be 10 mm; and when the sampling rate is 60 Gb/s with 12 ps pulses, the length difference can be 2 mm.

The various bits of the optical digital signal 14 are delayed in time by the waveguides 92 which can be appropriately sized using waveguide bends so that each bit generated by one of the channels 112 can be interlaced in time and combined into a single output waveguide 96. Combining of the various bits from each channel 112 into the single output waveguide 96 can be performed using a plurality of converging waveguide Y-junctions 98 as shown in FIGS. 4A and 4B, or alternately with a series of 2×1 MMI combiners. Each waveguide 92 and 96 of the optical waveguide combiner 90 can be formed as single-mode waveguides using the quantum-well intermixing fabrication process previously described with reference to FIGS. 3A-3D.

The matter set forth in the foregoing description and accompanying drawings is offered by way of illustration only and not as a limitation. The actual scope of the invention is intended to be defined in the following claims when viewed in their proper perspective based on the prior art.

Although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. An optical domain analog to digital conversion method comprising:
   mapping an optical analog signal onto a wavelength modulated optical beam;
   passing the mapped optical beam through a plurality of interferometers to generate a plurality of analog bit representation signals; and
   after passing the mapped optical beam through the plurality of interferometers, converting the plurality of analog bit representation signals into an optical digital signal, each of the plurality of analog bit representation signals corresponding to a respective bit of the optical digital signal,
   wherein the converting comprises:
   sampling each of the plurality of analog bit representation signals by modulating it onto a train of laser pulses and thresholding each of the resulting modulated laser pulse trains, thereby to generate a plurality of digital bit signals; and
   combining the plurality of digital bit signals into the optical digital signal.

2. The method of claim 1, wherein the optical analog signal is a radio frequency (RF) modulated optical signal and wherein the mapping comprises:
   generating the wavelength modulated optical beam with a laser; and
   modulating the wavelength modulated optical beam with the optical analog signal.

3. The method of claim 2, further comprising:
   receiving the optical analog signal at a photodiode configured to modulate the laser.

4. The method of claim 1, wherein each of the plurality of interferometers includes an Mach-Zehnder interferometer (MZI) having a pair of arms, a first arm of each MZI having the same length, and a second arm of each MZI having a respectively different length.

5. The method of claim 1, wherein the thresholding of each modulated laser pulse train is performed in a nonlinear optical amplifier.

6. An optical domain analog to digital conversion apparatus comprising:
   a photodiode configured to receive an optical analog signal;
   a wavelength modulated laser coupled to the photodiode that maps the optical analog signal received by the photodiode to a wavelength modulated optical beam;
   a plurality of interferometers coupled to the wavelength modulated laser, each interferometer having an input coupled to the wavelength modulated laser and an output that produces an analog bit representation signal from the mapped wavelength modulated optical beam; and
   a plurality of sample and threshold circuits corresponding to the plurality of interferometers, each sample and threshold circuit coupled to the output of the corresponding interferometer and to the output of a laser source of a pulse train for sampling, and adapted to produce from the interferometer output and the sampling pulse train a digital bit optical signal from the analog bit representation signal.

7. The apparatus of claim 6, further comprising:
   a combining circuit coupled to the plurality of sample and threshold circuits that combines the digital bit optical signals of the plurality of sample and threshold circuits into an optical digital signal.

8. The apparatus of claim 6, further comprising:
   a beam splitter and a plurality of amplifiers coupled between the laser the plurality of interferometers.

9. The apparatus of claim 6, wherein each of the plurality of interferometers includes an interferometer having a pair of arms, a first arm of each interferometer having the same length, and a second arm of each interferometer having a respectively different length.

10. The apparatus of claim 6, wherein the plurality of interferometers are Mach-Zehnder interferometers.

11. An optical domain analog to digital conversion apparatus comprising:
- a photodiode configured to receive an optical analog signal;
- a wavelength modulated laser coupled to the photodiode that maps the optical analog signal received by the photodiode to a wavelength modulated optical beam;
- a plurality of interferometers coupled to the wavelength modulated laser, each interferometer having an input coupled to the wavelength modulated laser and an output that produces an analog bit representation signal from the mapped wavelength modulated optical beam; and
- a plurality of sample and threshold circuits corresponding to the plurality of interferometers, each sample and threshold circuit coupled to the output of the corresponding interferometer to produce a digital bit optical signal from the analog bit representation signal,
- wherein each of the plurality of sample and threshold circuits comprises:
- a sampling gate having an output, a first input coupled to the output of the corresponding interferometer, and a second input configured to receive a plurality of sampling pulses; and
- a threshold element coupled to the output of the sampling gate.

12. The apparatus of claim 11, wherein the threshold element comprises a semiconductor optical amplifier.

13. The apparatus of claim 11, wherein the sampling gate is an AND gate.

14. The apparatus of claim 13, wherein the AND gate comprises:
- a photodiode coupled to the output of the corresponding interferometer;
- an electro-absorption modulator (EAM) coupled to the photodiode configured to receive the plurality of sampling pulses and generate a digital bit signal.

* * * * *